June 30, 1970 D. L. FUNSTON ET AL 3,518,363

HUE CONTROL CIRCUITRY

Filed March 28, 1967 3 Sheets-Sheet 1

INVENTORS
DAVID L. FUNSTON
MARION J. PIFER
ROBERT C. WHEELER
BY
Robert E. Strauss
ATTORNEY INVENTORS
DAVID L. FUNSTON
MARION J. PIFER
BY ROBERT C. WHEELER
Robert E. Strauss
ATTORNEY

HUE CONTROL CIRCUITRY

Filed March 28, 1967 3 Sheets-Sheet 3

INVENTORS
DAVID L. FUNSTON
MARION J. PIFER
ROBERT C. WHEELER
BY
Robert E. Strauss
ATTORNEY

3,518,363
HUE CONTROL CIRCUITRY

David Lee Funston, Batavia, Marion Jonathan Pifer, Williamsville, and Robert Charles Wheeler, Batavia, N.Y., assignors to Sylvania Electric Products Inc., a corporation of Delaware Filed Mar. 28, 1967, Ser. No. 626,589
Int. Cl. H04n 9/50
U.S. Cl. 178—5.4 5 Claims

ABSTRACT OF THE DISCLOSURE

Circuitry is provided for controlling the hue of a reproduced image in a color television receiver. The phase of a periodically recurring color burst signal and a developed reference oscillation signal are shifted with respect to one another by a network tuned to resonance at the frequency of a subcarrier signal and including an inductor whereacross one of the above-mentioned signals appear. The inductor is shunted by a parallel connected first capacitance means and a resistor. The resistor has a positionable arm, and a second capacitance means couples the positionable arm of the resistor to an end terminal of the inductor. The resistance of the tuned circuit remains substantially constant and the desired phase shift is accomplished by varying the location of the positionable arm of the resistor which, in effect, varies the capacitance content of the resonant network.

BACKGROUND OF THE INVENTION

Present-day color television receivers usually include a color image reproducer and a manually adjustable control, readily available to a viewer, for adjusting the hue of the reproduced color image in accordance with the desires of the particular viewer. Also, the usual color television receiver provides a color image in response to a composite color signal which includes a modulated subcarrier signal conveying chrominance information and periodic recurring color burst signals of oscillations at the subcarrier frequency. The receiver includes a means for separating the color burst signals from the composite color signal, a means for generating a reference oscillation signal at the subcarrier frequency, a means for comparing the phase of the color burst signals and the reference oscillation signals with respect to one another, and a means for shifting the phase of one of the above signals with respect to the other to effect an alteration in the hue of the reproduced color image.

The prior art suggests numerous techniques for effecting the above-mentioned phase shifting and hue control of a reproduced color image. For example, one prior art technique proposes the connection of a variable capacitor across a tuned circuit whereacross the generated reference oscillation signals appear. Thus, the phase of the generated oscillation signals may be shifted by altering the setting of the capacitor.

However, variable capacitors suitable for the above application are relatively inconvenient. Often, it is difficult to physically locate the capacitor such that adjustment is readily available to a viewer. Moreover, the utilization of mechanical coupling to provide the desired accessibility for control by a viewer is not only inconvenient and complex but also relatively expensive.

Another prior art technique for effecting the desired phase shift and hue control suggests a first and second capacitance series connected in shunt with an inductor of a resonant circuit and an alterable resistor connected in shunt with the second capacitor. Varying the position of the alterable arm of the resistor varies the amount of resistance inserted into the resonant circuit which, in turn, shifts the phase of the signal appearing thereacross.

While the above technique has been and still is employed in numerous television receivers and has provided reasonably satisfactory results, it has been found that there exists areas wherein improvement is highly desirable. For instance, it is well known that varying the resistance of a resonant circuit has a substantial effect on the Q of the circuit. Thus, a hue control circuit utilizing resistance alteration varies the Q of a tuned circuit wherefrom a color burst signal is obtained also causes a variation in the amplitude of the color burst signal. Since the magnitude of the color burst signal is frequently utilized in the automatic chroma control (ACC) circuitry of present-day receivers, it can be readily understood that varying the amplitude of the color burst signal has a deleterious effect upon the receiver.

Further, it has been found that resonant circuitry utilizing a varying resistance-type tuning has a tendency to ring at the tuned frequency or at the position of maximum Q. Also, the resultant color burst signal is not only phase shifted but of relatively high amplitude which, in turn, causes the color killer circuitry of the receiver to operate and kill the color signal. Further, the addition of resistance to dampen the ringing is not only expensive but also tends to greatly reduce the magnitude of the color burst signals.

OBJECTS AND SUMMARY OF THE INVENTION

It is therefore an object of the present invention to provide enhanced hue control circuitry for a color television receiver. Another object of the invention is to provide hue control circuitry which is inexpensive and conveniently adjustable by a viewer. Still another object of the invention is to provide enhanced hue control circuitry for shifting the phase of a color burst signal and a generated reference oscillation signal with respect to one another and suitable for remote control convenient to a viewer. A further object of the invention is to provide enhanced hue control circuitry wherein a signal is phase shifted by a resonant circuit having a substantially constant resistance and a variable impedance, thereby having a minimum effect on burst amplitude.

These and other objects, advantages, and capabilities are achieved in one aspect of the invention by a parallel connected first capacitive means and resistor having a positionable arm shunting the inductor of a resonant circuit and a second capacitive means coupling the positionable arm of the resistor to one end terminal of the inductor. The first capacitive means is preferably in the form of an inherent distributed capacity in a shielded cable. The capacity shunts the inductor and a conductor of the cable couples a resistor, located at a point convenient to a viewer, in shunt with the inductor and first capacitive means.

DESCRIPTION OF THE PREFERRED EMBODIMENT

In order to provide a better understanding of the present invention as well as other and further objects, advantages, and capabilities thereof, reference is made to the accompanying drawings and appended claims in conjunction with the following disclosure.

Figure 1:
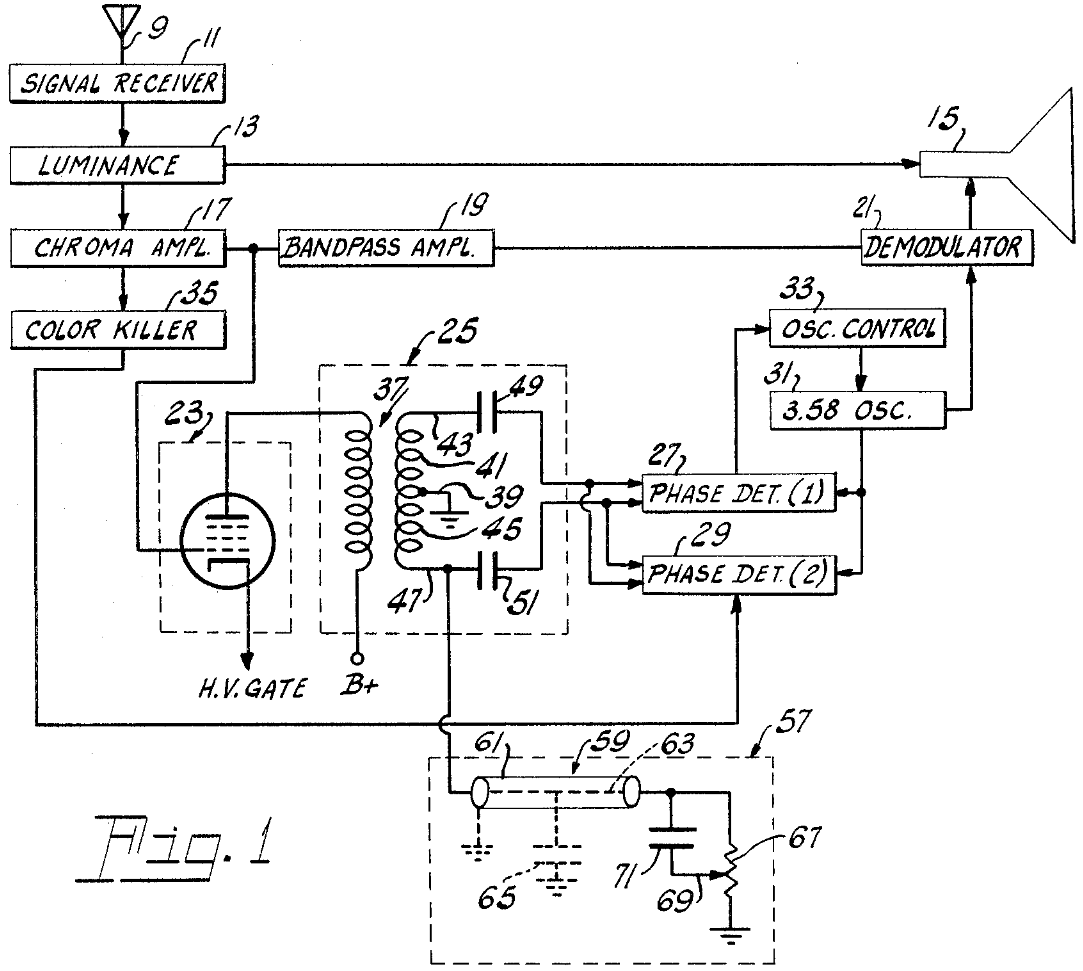
FIG. 1 is an illustration, partly in block and partly in schematic form, of a color television receiver employing one embodiment of the hue control circuitry of the invention.

Referring to the drawings, FIG. 1 illustrates a color television receiver including an antenna 9 for intercepting transmitted color signals, a signal receiver 11 coupled to the antenna 9 and including the usual radio frequency (RF) and intermediate frequency (IF) amplification and detection stages, and a luminance channel 13 coupled to the signal receiver 11 and providing signals delayed in time and representative of brightness variations in a viewed scene which are applied to a color reproducer or picture tube 15. Also, a signal from the luminance channel 13 is applied to a chrominance amplifier stage 17 wherein the composite color signal is amplified and applied to a bandpass amplifier stage 19. The bandpass amplifier stage 19 separates the chrominance signals from the composite color signals and applies these chrominance signals to a demodulation system 21.

The composite color signal available from the chrominance amplifier stage 17 is also applied to a color burst separation and amplification stage 23. Herein, the color burst signals are separated from the composite color signal, amplified, and applied by way of coupling circuitry 25 to first and second phase detection stages 27 and 29 respectively.

A reference oscillation signal at a subcarrier frequency is generated by a reference oscillation signal generating means 31 and applied to the first and second phase detection stages 27 and 29 and to demodulation system 21. The demodulation system 21 employs a synchronous demodulation technique, well known in the art, to provide color difference signals which are applied to the image reproducer 15 wherein the color difference signals are combined with the luminance signals available from the luminance channel 13 to provide a color image reproduction.

The first phase detector stage 27 compares the color burst signals and reference oscillation signals applied thereto with respect to frequency and phase and develops a correction signal for any difference therebetween. This correction signal is applied to an ocillator control circuit 33 which is coupled to the reference oscillation signal generating means 31 causing the oscillation signal generating means 31 to operate at the correct frequency and phase.

The second phase detector stage 29 compares the color burst signals and reference oscillation signals applied thereto and provides a control signal in accordance with the presence or absence of the color burst signals. This control signal is coupled to and determines the operational condition of a color killer stage 35. In a well known manner, the color killer stage 35 is coupled to the chrominance amplifier stage 17 and renders the chrominance amplifier stage 17 either operable or inoperable depending upon the presence or absence of the color burst signals. Referring back to the coupling circuitry 25, there is included therein an inductor 37 having a center tap 39 connected to a voltage reference level such as circuit ground. The inductor 37 has a first inductive portion 41 intermediate the center tap 39 and the terminal end 43 and a second inductive portion 45 intermediate the center tap 39 and the other terminal end 47. Each of the terminal ends 43 and 47 is connected to the first and second phase detection stages 27 and 29 by a capacitor 49 and 51 respectively.

A hue control circuit 57 is coupled to the junction of the second inductive portion 45 of the inductor 37 and the capacitor 51, and includes a shielded cable 59 having a shield 61, a conductor 63, and a first capacitive means 65 in the form of a distributed capacity (illustrated in phantom form); a resistor 67 having a positionable arm 69; and a second capacitive means 71. The shield 61, one end of the first capacitive means 65, and one end of the resistor 67 are connected to circuit ground and the conductor 63 couples the other end of the first capacitive means 65 and the resistor 67 to the junction of the inductive portion 45 and capacitor 51. Also, the second capacitive means 71 couples the positionable arm 69 of the resistor 67 to the conductor 63.

Figure 2:
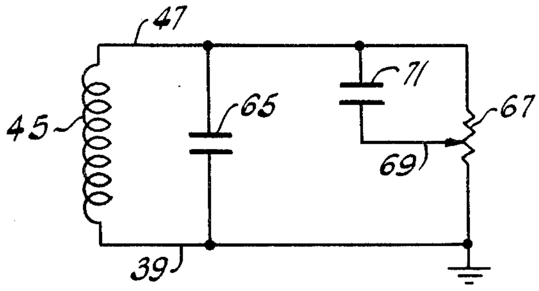
FIG. 2 is an equivalent circuit illustration of the hue control circuitry of FIG. 1.

To more clearly illustrate the electrical connection of the above-described hue control circuitry 57, reference is made to the equivalent circuit illustration of FIG. 2. As can readily be seen therein, the first capacitive means 65 and the resistor 67 are connected in parallel with one another and shunted across the second inductive portion 45 of the inductor 37 of the coupling circuitry 25. Also, the second capacitive means 71 couples the positionable arm 69 of the resistor 67 to the terminal end 47 of the inductor 37. Thus, the first capacitance means 65 and the resistor 67 are in the circuit continuously while the capacity present in the circuit due to the second capacitance means 71 is varied in accordance with the location of the positionable arm 69 of the resistor 67.

As to the general operation, composite color signals which include modulated subcarrier signals, usually at a frequency of about 3.58 megacycles, conveying chrominance signals and periodically recurring color burst signals of a few oscillations at the subcarrier frequency, are applied to the burst separation and amplification stage 23. The burst separation and amplification stage 23 is gated, usually by high voltage pulse signal applied to the cathode, and provides color burst signals which appear across the inductor 37 of the coupling circuitry 25.

The coupling circuitry 25 includes a first inductive portion 41, a capacitor 49, a second inductive portion 45, and a capacitor 51 and is nominally tuned to resonance at the frequency of the subcarrier signals. The color burst signal is applied to the first and second phase detection stages 27 and 29. Also, a reference signal nominally at the subcarrier frequency generated by a reference oscillation signal generating means 31 is applied to the first and second phase detection stages 27 and 29.

The first phase detection stage 27 compares the color burst signals and generated reference oscillation signals in so far as phase is concerned and develops an error signal representative of a phase angle other than a predetermined phase angle difference between the color burst and reference oscillation signals and applies this error signal to an oscillator control circuit 33. This oscillator control circuit 33 is coupled to and causes a shift in the generated reference oscillation signals. This shift in the reference oscillation signals provides the above-mentioned predetermined phase angle difference between the color burst signals and the reference oscillation signals while shifting the hue of a reproduced color image.

The second phase detection stage 29 also receives the color burst signals from the resonant coupling circuitry 25 as well as the reference oscillation signals from the reference oscillation signal generating means 31. The second phase detection stage 29 provides a control signal, in accordance with the presence or absence of color burst signals, which are applied is a color killer stage 35. The operation of the color killer stage 35 is modified in accordance with the received control signal and, in turn, modifies the operation of the chrominance amplifier depending upon the presence or absence of a color burst signal in the transmitted signal intercepted by the antenna 9 of the television receiver.

The hue control circuit 57 is coupled to the coupling circuitry 25, in this instance the junction of the inductive portion 45 and capacitor 51, and includes the first capacity means 65 and resistor 67 essentially connected in parallel and shunting the inductive portion 45 of the inductor 37. Also, the resistor 67 includes a positionable arm 69 which is coupled by a second capacitive means 71 to the end terminal 47 of the inductive portion 45 of the inductor 37.

It can be readily understood that varying the location of the positionable arm 69 of the resistor 67 provides a varying amount of the second capacity means 71 essentially in shunt connection with the parallel connected first capacity means 65 and the resistor 67 shunting the inductive portion 45 of the inductor 37. In this manner, the tuning of the coupling network 25, including both inductive portions 41 and 43, due to the relatively close coupling therebetween, is altered causing a shift in phase of the color burst signals appearing across the inductive portion 45 of the inductor 37. These phase shifted color burst signals are applied to the first phase detection stage 27 which, in turn, provides an error signal which is applied to the oscillator control circuitry 33 causing a shift in the reference oscillation signals generated by the reference oscillation signal generating means 31 and applied to the first phase detection stage 27 and the demodulation system 21.

Thus, the hue control circuit 57 provides a means for altering the phase of the color burst signals which are compared, in so far as phase angle is concerned, with generated reference oscillation signals. In turn, an error signal is provided which causes a phase shift in the generated reference oscillation signals which are applied to a demodulation system 21. The demodulation system 21, by a synchronous demodulation technique, compares the amplitude and phase relationship of received chrominance information and the phase shifted reference oscillation signals to provide a shift in the hue of a reproduced color image.

Figure 3:
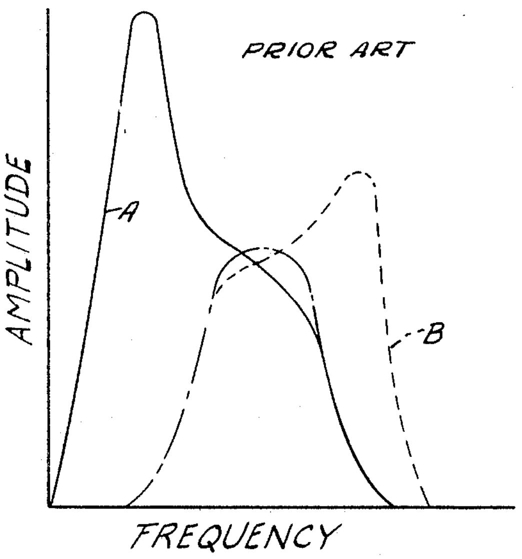
FIG. 3 is a comparative illustration of the color burst signal amplitude-frequency response characteristics of a prior-art hue control circuit.
Figure 4:
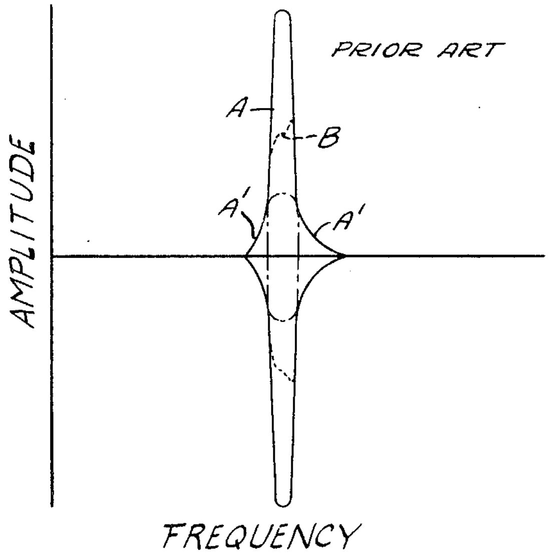
FIG. 4 is a comparative illustration of the color burst signal envelope of a prior-art hue control circuit.

For purposes of comparison and illustration, reference is made to FIG. 3 illustrating a color burst signal amplitude vs. frequency response curve for one known type of hue control circuitry utilizing resistance variations as a means for tuning a resonant circuit. As is well known, the Q or quality factor of a resonant circuit is greatly dependent upon the resistance included therein. Thus, resonant tuning by resistance variation techniques provides relatively large variations in signal amplitude. Also, an observation of the color burst signal envelope, shown in FIG. 4, indicates not only the relatively large amplitude variations but also the tendency to ringing and distortion of the envelope when the resistance is removed or at least reduced.

Figure 5:
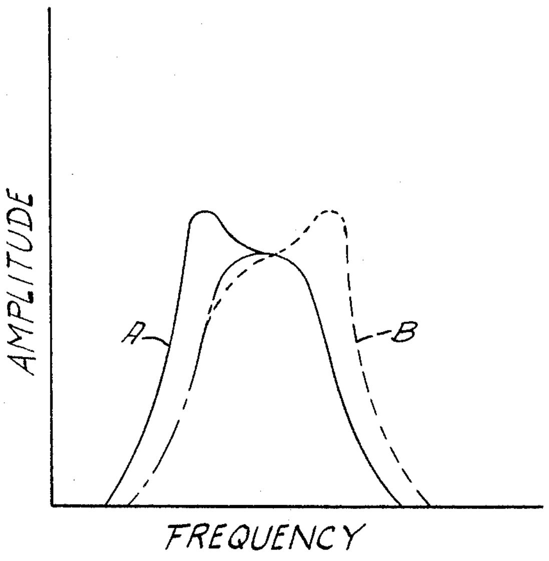
FIG. 5 is a comparative illustration of the color burst signal amplitude-frequency response characteristics of the hue control circuitry of FIG. 1.
Figure 6:
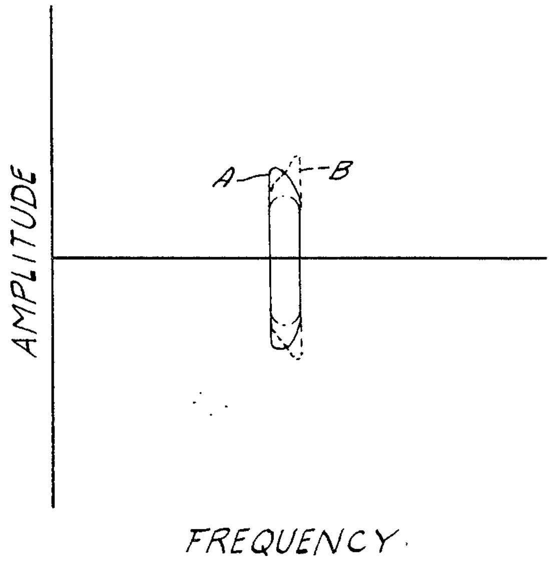
FIG. 6 is a comparative illustration of the color burst signal envelope of the hue control circuitry of FIG. 1.

However, observations of the color burst signal amplitude vs. frequency response curves (illustrated in FIG. 5) of hue control circuitry wherein the resistance of a resonant circuit is maintained substantially constant while variations in resonant circuit tuning are obtained by altering the capacity of the resonant circuit indicate relatively small variations in signal amplitude. Also, observation of the color burst signal envelope (FIG. 6) of such hue control circuitry indicates that the substantially constant resistance of the resonant circuitry virtually eliminates the tendency toward ringing and distortion of the envelope.

More specifically, prior art circuitry having an inductor shunted by a pair of series connected capacitors with an adjustable resistor shunting one of the capacitors tends to provide an increasing signal amplitude (Curve A of FIG. 3) with decreasing resistance value and an increasing signal amplitude (Curve B of FIG. 3) with increasing resistance value. Also, the color burst signal envelope (Curve A of FIG. 4) has an increased amplitude with ringing distortion (Curve A′) with decreasing resistance values and an increased amplitude (Curve B of FIG. 4) with increasing resistance values.

In contrast, altering the capacity rather than resistance value of the hue control circuitry, illustrated in FIG. 2, provides a comparatively small change in signal amplitude (Curves A and B of FIG. 5) for maximum and minimum adjusmtents since the resistance remains substantially unchanged to dampen the circuitry at all times. Also, the magnitude of the color burst signal remains comparatively stable for maximum and minimum adjustments (Curves A and B of FIG. 6) of the hue control circuitry. Moreover, the ringing distortion (Curve A′ of FIG. 4) so clearly evident when the resistance value of the circuitry is reduced, is no longer evident when the capacitive reactance rather than the resistance value is altered (see FIGS. 5 and 6).

Figure 7:
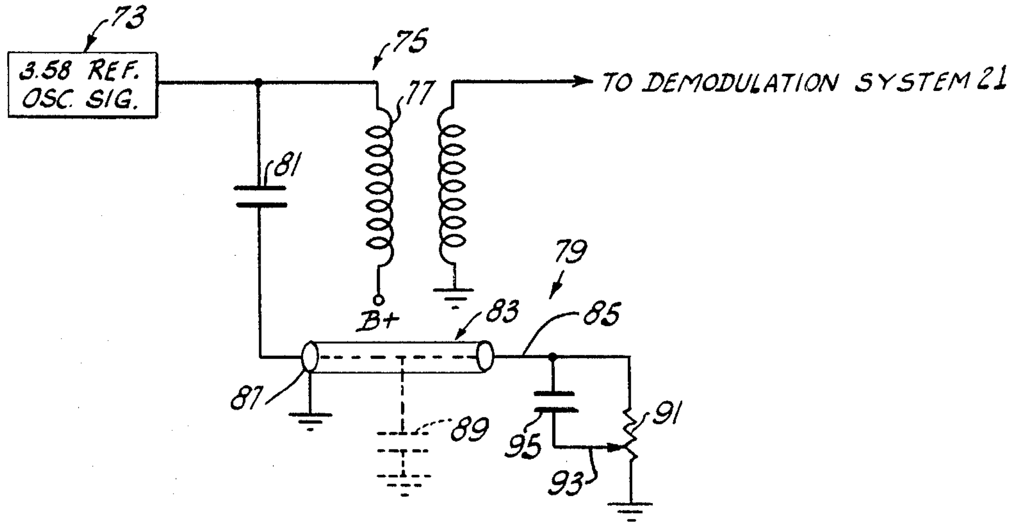
FIG. 7 is an alternative embodiment of the hue control circuitry of the invention.

FIG. 7 illustrates another embodiment of the hue control circuitry suitable for use in a color television receiver. In this instance, the receiver includes a source of reference oscillation signals 73 having an output network 75 including an inductive means 77 coupled to a voltage source B+. Also, a hue control circuit 79 is coupled to the output network 75 by a capacitor 81 which serves to prevent application of the potential from the voltage source B+ to the hue control circuit 79.

The hue control circuit 79 is substantially similar to the hue control circuit 57 of FIG. 1 and includes a shielded cable 83 having a conductor 85, a shield 87, and a first capacitance means 89 in the form of an inherent distributed capacitance intermediate the conductor 85 and shield 87. The shield is connected to a voltage reference level and one end of the conductor 85 is connected to the capacitor 81. The other end of the conductor 85 is connected to one end of a resistor 91 having the other end thereof connected to the voltage reference level. The resistor 91 has a positionable arm 93 which is coupled by a second capacitance means 95 to the conductor 85.

Figure 8:
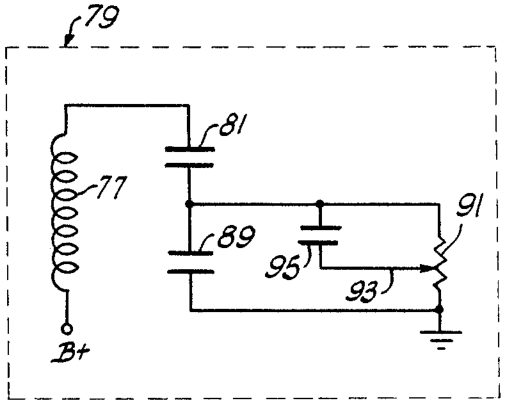
FIG. 8 is an equivalent circuit illustration of the hue control circuitry of FIG. 7.

To further clarify the hue control circuitry 79, reference is made to the equivalent circuit illustration of FIG. 8. As can readily be observed therein, the inductive means 77 is coupled to a voltage source B+. The capacitor 81 and first capacitance means 89 are series connected and shunted across the inductive means 77. Also, the resistor 91 is shunted across the first capacitance means 89 and includes a positionable arm 93 which is coupled by a second capacitance means 95 to the junction of the series connected capacitor 81 and first capacitance means 89 and to one end of the resistor 91.

In operation, reference oscillation signals developed in the receiver appear across the inductive means 77 which is nominally tuned to resonance at the frequency of the subcarrier signals, usually 3.58 mc. The positionable arm 93 of the resistor 91 is shifted in location to cause a shift in the amount of the second capacitance means 95 in shunt connection with the first capacitance means 89. Thus, the effective capacity of the network 75, nominally tuned to resonance at the frequency of the subcarrier signal, is altered causing a phase shift in the reference oscillation signals applied to a demodulation system 21. This shift in phase of the reference oscillation signals in conjunction with the chrominance signals applied to the demodulation system 21 produces a shift in hue of a reproduced color image.

Thus, there has been provided enhanced hue control circuitry for a color television receiver. The circuitry is inexpensive, simple, and conveniently available for adjustment by a viewer. Further, the circuitry provides a minimal deleterious effect upon the chrominance signals of a color receiver and virtually eliminates the need for spurious signal dampening devices. Moreover, this minimal deleterious effect upon the chrominance signals is accomplished by hue control circuitry wherein is maintained a substantially constant resistance while varying the capacity thereof to effect a shift in phase of an applied signal.

While there has been shown and described what are at present considered the preferred embodiments of the invention, it will be obvious to those skilled in the art that various changes and modifications may be made therein without departing from the scope of the invention as defined by the appended claims.

We claim:

1. In a color television receiver for reproducing color images in response to composite color signals which include modulated subcarrier signals conveying chrominance information and periodically recurring color burst signals of oscillation at subcarrier signal frequency, said receiver including means for separating said color burst signals from said composite color signals and means for generating reference oscillation signals at the subcarrier signal frequency, each of said means having an output network including an inductive means nominally resonant at the frequency of said subcarrier signals, a hue control circuit comprising in combination:

first capacitance means shunting at least a portion of said inductance means of one of said color burst signal separating and reference oscillation signal generating means;

a resistor directly connected in shunt with said portion of said inductance means shunted by said first capacitance means, said resistor having a positionable arm; and second capacitance means directly connected to said positionable arm of said resistor and to one end of said portion of said inductance shunted by said first capacitance means whereby altering the location of said positionable arm of said resistor varies the capacity of said output network shifting the phase of said signals appearing across said inductor and the hue of a reproduced color image.

2. The hue control circuit of claim 1 including a shielded cable having a conductor, an enclosing shield, and inherent distributed capacity intermediate said conductor and shield, said first capacitance means being in the form of said distributed capacity of said shielded cable.

3. The hue control circuitry of claim 1 including a shielded cable having a conductor directly coupling said inductive means to said resistor, an enclosing shield for said conductor coupled to a voltage reference level, and inherent distributed capacity intermediate said conductor and shield, said distributed capacity constituting said first capacitance means and said resistor having a location remote from said inductive means.

4. The hue control circuit of claim 1 wherein said inductive means whereacross said color burst signals appear is directly shunted by said first capacitance means and resistor having a positionable arm and said second capacitance means is directly connected to said positionable arm and to one end of said inductive means whereby said color burst signals are phase shifted in accordance with a shift in location of said positionable arm causing a shift in hue of a reproduced color image.

5. The hue control circuit of claim 1 wherein said inductive means whereacross said reference oscillation signals appear has at least a portion thereof directly shunted by said first capacitance means and said resistor having a positionable arm and said second capacitance means is directly connected to said positionable arm of said resistor and to one end of said inductive means whereby said reference oscillation signals are phase shifted in accordance with a shift in location of said alterable arm of said resistor causing a shift in hue of a reproduced color image.

References Cited

UNITED STATES PATENTS

| | | | |
|---|---|---|---|
| 2,881,245 | 4/1959 | Fenton et al. | 178—5.4 |
| 3,007,999 | 11/1961 | Kelly. | |
| 3,436,470 | 4/1969 | Konkel et al. | 178—5.4 |

RICHARD MURRAY, Primary Examiner

R. P. LANGE, Assistant Examiner